AIR TRACK

Filed Dec. 3, 1959 6 Sheets-Sheet 1

INVENTOR:
William R. Bertelsen
BY
Eberhard E. Wattley
Atty.

Jan. 22, 1963 W. R. BERTELSEN 3,074,764

AIR TRACK

Filed Dec. 3, 1959 6 Sheets-Sheet 2

INVENTOR:
William R. Bertelsen
BY
Eberhard E. Wattey
Atty.

INVENTOR:
William R. Bertelsen
BY
Eberhard E. [signature] Att'y.

Jan. 22, 1963 W. R. BERTELSEN 3,074,764

AIR TRACK

Filed Dec. 3, 1959 6 Sheets-Sheet 4

INVENTOR:
William R. Bertelsen
BY
Eberhard E. Wettley
Atty.

INVENTOR:
William R. Bertelsen
BY
Eberhard E. Wottley
Atty.

INVENTOR:
William R. Bertelsen
BY
Eberhard E. Wittey
Att'y.

United States Patent Office 3,074,764

Patented Jan. 22, 1963

3,074,764

AIR TRACK

William R. Bertelsen, Neponset, Ill., assignor, by direct and mesne assignments, of twenty-five percent to William E. Martin, Kewanee, Ill., and twenty-five percent to Martin Engineering Company, Neponset, Ill., a corporation of Illinois Filed Dec. 3, 1959, Ser. No. 857,213

17 Claims. (Cl. 305—11)

In general, this invention relates to a track type tractor or other vehicle incorporating new high speed and light weight driving means or motivating mechanisms that function to propel such tractor or vehicle across various kinds of terrain or across wet or swampy regions, and over water with equal facility.

More specifically, the present invention is directed to an air track assembly adapted for driving or manipulating a vehicle or other mobile unit on land or water, with the air track comprising a low friction mechanism supplying adequate control and traction under all conditions of use regardless of the physical condition of the surface being traversed.

To further elaborate on the nature and embodiment of the air track assembly of the present invention, this mechanism may be employed as the driving means for farm tractors and farm vehicles; for military vehicles such as tanks, carriers, personnel cars and transports; for utility cars such as used in industry, or by ranchers and explorers; for snowmobiles; for use in connection with agricultural equipment and implements that are adapted for the care and cultivation of the rice and sugar cane areas; and for the support or locomotion of large derricks, power shovels, drags, earth movers and other analogous equipment.

One of the objects of this invention is to provide a support and/or power mechanism to bodily actuate a vehicle or other mobile unit, wherein the mechanism embodies a controlled supply of air under pressure to part or separate the coacting movable and stationary assemblies of the traction power mechanism to establish an air cushion lubrication and air upheld support for the mobile unit per se upon the driving track mechanism.

Another object is to provide an air track vehicle motivating assembly that is light in weight, simple in design and low in first cost, and one that has low cost maintenance as well as low operating cost.

Since the air track is such as to provide a simple light weight assembly, extremely high speeds may be attained, to which may be added the facility of providing a completely assembled vehicle and track contributing to the attainment of a low silhouette for stream line purposes and for low clearances, etc., not to overlook the obvious benefits of a low height vehicle for military uses and operations.

Another object is to provide a light weight, air lubricated power track that will operate efficiently under adverse conditions in mud, snow, on ice, in clay or sand; and which will counteract fouling of the essential coacting driving parts by the substances or materials forming the road bed support for the air track and the vehicle carried thereby.

Still further objects and advantages reside in the use of a light weight high speed air track that is capable of traveling over the ground with very low soil compactness resulting from the track tread members; the flexibility and feasibility residing in a selectivity of providing long air track units or very wide shorter units designed to carry any given load and to produce any amount of desired traction for a particular load; the self-cleaning ability of the track; and the optimum minimum frictional operation of this air track to simultaneously sustain heavy loads and to transport such loads under poor roadbed conditions or over water.

Other objects and advantages shall hereinafter appear in or become evident from the following detailed description of the present invention having reference to the accompanying drawings forming a part of this specification.

Figures 13, 14, 15, 16:
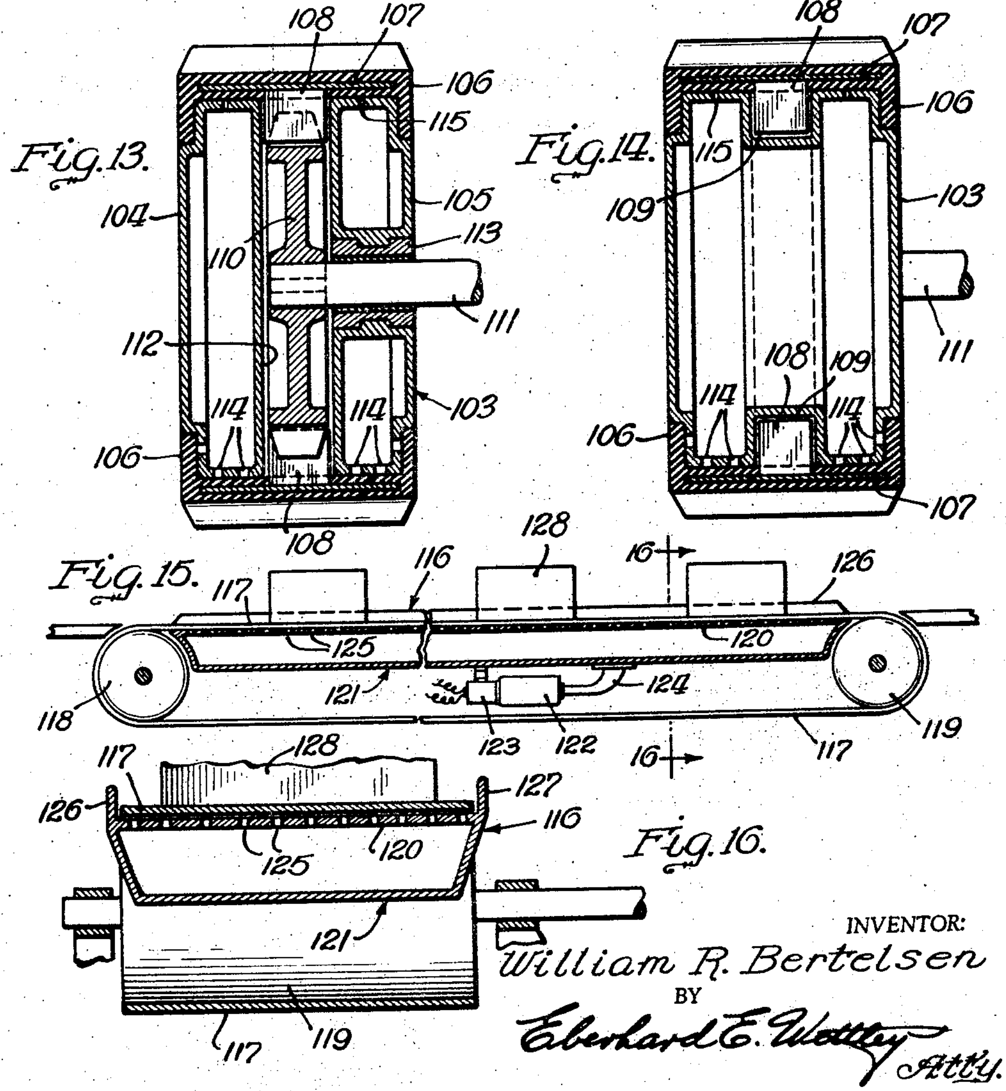
FIG. 13 is a vertical cross sectional view taken along the propulsion end of the power air track shown in FIG. 12 on the plane of the line 13—13 in that view.
FIG. 14 is an other vertical cross sectional view of the modified air track of FIG. 12 taken along a plane of the line 14—14 in FIG. 12 remote from the driving means location of this track.
Figure 17:
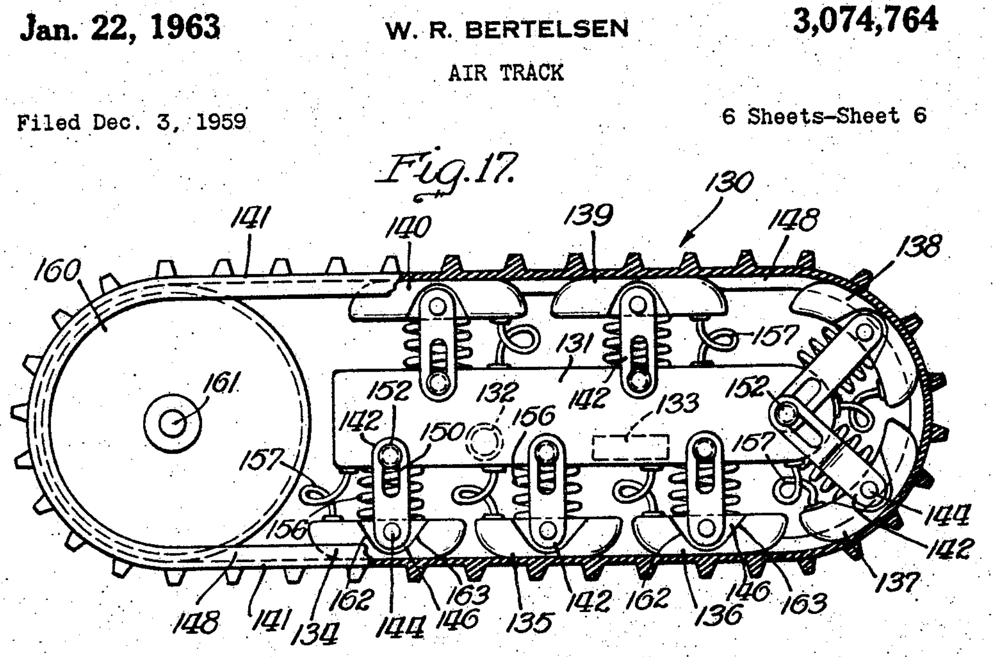
Figure 18:
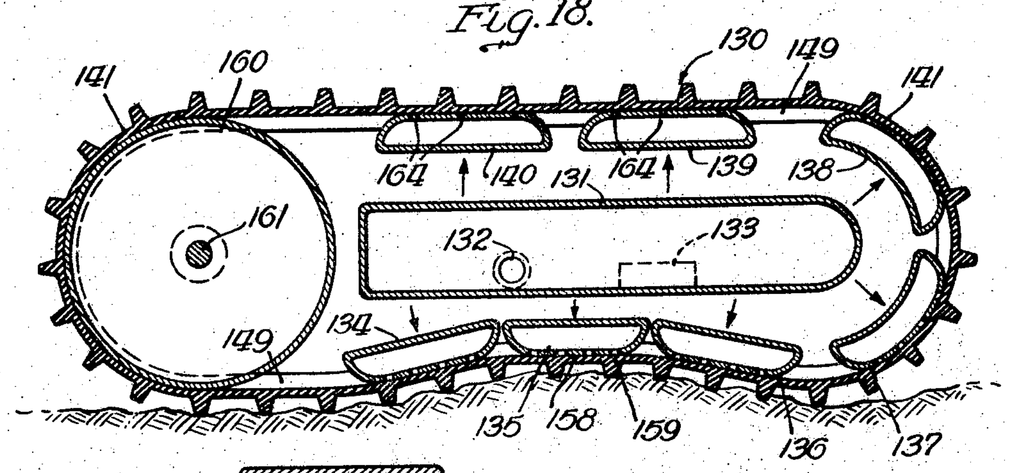
Figure 19:
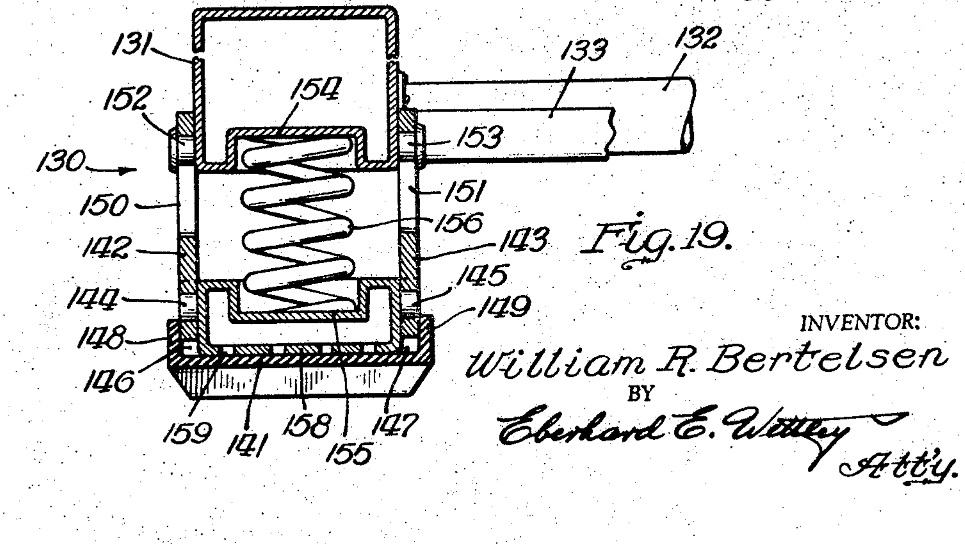

FIG. 15 portrays a side elevational view in section taken in a vertical plane longitudinally of a modified structure representing a conveying apparatus embodying the same principles of operation as the air tracks illustrated in the above noted views, the apparatus in FIG. 15 demonstrating the adaptability of the air track means to the transport or carriage of articles such as cargo, merchandise, wares of all sorts, etc.;

FIG. 16 illustrates a vertical cross sectional view of the conveying apparatus as it appears when viewed substantially along the plane of the line 16—16 in FIG. 15;

FIG. 17 illustrates a side elevational view of an air track construction employing a plurality of articulated air shoes all working in cooperation with a flexible track, the air shoes including spring means to introduce a combination of air lubrication and resiliency of the track to pass over irregularities and ground obstructions which are accommodated under automatic track deformations;

FIG. 18 illustrates another view of a diagrammatic nature with parts shown in section and as some of the articulate air shoes will react to a ground obstruction, continuing to furnish support for an attached vehicle while permitting track deformation, but maintaining the same efficient air glide or cushion reaction upon the track moving relatively to the shoes under the forward progress of the track assembly; and FIG. 19 is a vertical cross sectional view of one track shoe unit, taken traversely to the views shown in FIGS. 17 and 18, to illustrate further details of construction relating to the articulate independent resilient suspension of each shoe and to the guiding structure that holds the shoes in their operative relation to the track to maintain a given line of travel for the track.

Figures 1, 2, 3:
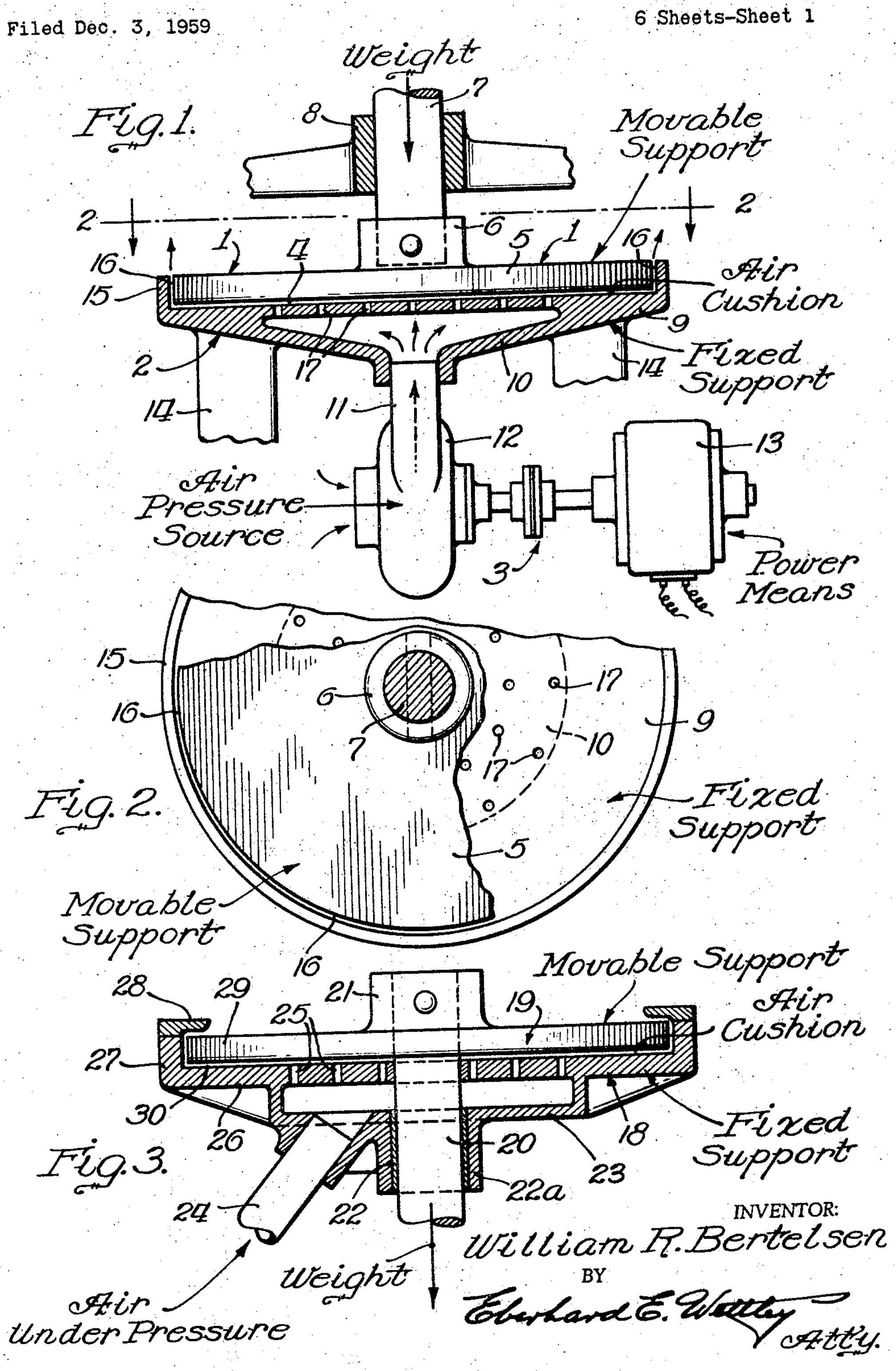
FIG. 1 is a side elevational view partly in section of a diagrammatic arrangement that depicts the general principle underlying the air track mechanism herein devised and disclosed.
FIG. 2 is a top plan sectional view of the demonstrating unit shown in FIG. 1 as such means appear when viewed substantially along the plane of the line 2—2 in FIG. 1.
FIG. 3 is another diagrammatic view in side elevation, partially in section, to demonstrate a further adaptation of the pressurized air lubrication principle used in the design of the air track of the present invention.

Primarily the principle herein evolved as it is applied to the advantages and benefits derived from the simple, light weight air track of the present invention may be best understood with reference to FIGS. 1 and 2 of the drawings. The apparatus there shown is supplemented with legends to aid in interpreting the essential assembled elements used to show how two coacting parts may be relatively moved or actuated under extremely low friction conditions while supporting a load or any object on one member to be carried by an air cushion established between the coacting parts that make this arrangement feasible.

In FIGS. 1 and 2, the apparatus comprises a movable support 1, a fixed support 2, and an operative system 3 to supply air under pressure into the space between the supports 1 and 2 to establish a pressurized air cushion at 4. Movable support 1 is made as a solid disc 5 having a hub 6 to carry a shaft 7 supporting the weight of a supported instrumentality which shaft is guided for rotation in appropriate means such as the fixed bearing 8, etc. Any suitable driving mechanism may be used to move the support 1, which in this case is employed as a rotatable fixture for purposes of explanation.

The stationary or fixed support 2 comprises a hollow reactionary bed 9 providing an air box or plenum 10 that receives the discharge duct 11 of an air supply blower or pump 12 that is controlled and driven by a suitably connected motor 13 as the power means to operate the blower.

The bed 9 is mounted upon a rigid frame 14 and the bed provides an annular rim 15 to establish an air exhaust path 16 in conjunction with the disc 5 and at right angles to the disposition of the air cushion 4. Bed 9 is further provided with openings or orifices 17 to permit air under pressure to flow into the space of the area between disc 5 and bed 9 as the air is delivered from within the air pressure source such as the blower 12.

With the apparatus shown in FIG. 1, it is possible to establish an air cushion at 4 that is buoyant enough to support the disc 5 in spaced relation above the reactionary bed 9, with the motor-blower means of the operative system 3 maintaining a given pressure value of air between the supports 1 and 2 to cause the disc to move or rotate on said air cushion spaced above the adjacent surface of the reactionary bed 9. Air spills out of the annular exhaust path 16, but this lost air is continually replenished by the blower 12.

Conceivably, the exhaust path 16 can be made extremely small under reduced clearance tolerances, or suitable air retention glands and the like can be incorporated between the relatively movable supports 1 and 2. However, for simplicity of design and for complete freedom of operation, it is desirable to merely establish a simple convenient coacting clearance relationship between supports 1 and 2, together with a selected pressurized air cushion that will hold disc 5 in a given controlled suspension for frictionless operation in its movement relatively to the bed therebeneath.

It should be observed and kept in mind that the air pressures need not be excessive and that for many ordinary purposes the pressure can be in the very low ranges. Obviously, the load provides the basis for establishing the pressures required in relation to the coacting effective areas of the two supports. As an example, a 12 inch diameter disc such as 9 can support a load of approximately 2260 lbs. on a sustained air pressure cushion of 20 lbs. per sq. in. Raising the air pressure value to 40 lbs. per sq. in. immediately establishes a friction free load carriage or support of about 4520 lbs. or 2¼ tons, all being upheld or sustained by a one foot diameter disc.

The feasibility and efficiency of providing a friction free suspended load should be apparent from the description and explanation above given with reference to the diagrammatic apparatus disclosed in FIGS. 1 and 2. FIG. 3 demonstates another apparatus adapted to the application of a friction-free load carrying arrangement as utilized to provide an air fluid cushion or physical separation between two relatively movable members or supports of a coacting instrumentality of the kind herein disclosed.

FIG. 3 shows a fixed support 18, a movable support 19, a shaft 20 secured to hub 21 above the support 19 with the shaft depending through a bearing 22 in the hub 22a on the fixed support 18 to sustain or suspend a load by means of the shaft 20. The fixed support 18 comprises an air box or plenum 23 which is supplied with air under pressure through a suitable duct 24 having communication with an air pressure supply source, and openings or vents 25 bleed pressurized air through the bed 26 of the fixed support. The fixed support 18 is constructed with a peripheral rim 27 carrying an inwardly directed overhanging radial flange 28. Bed 26, rim 27 and flange 28 confine the movable support disc 29 within the air supply area and over the cushion zone above the fixed support 18 with the flange 28 forming a maximum upward separation stop for the disc 29 in relation to the adjacent reactionary surface 30 of the fixed support 18.

In operation, the FIG. 3 device performs the same friction free task as does the apparatus of FIG. 1, with FIG. 3 introducing a stop means to limit separation, if desirable, between the fixed and movable supports 18 and 19. In both the devices of FIG. 1 and FIG. 3, it should be noted that the exhausting air functions as anti-fouling means keeping the air cushion areas free from dirt, moisture, and foreign matter to insure friction free operation. The exhaust air in the FIG. 1 construction forms a cylindrical upwardly directed curtain of air about the structure above the disc 5. In the FIG. 3 unit, the air fans out radially inwardly across the face of disc 29 to be generally upwardly diverted by hub 21 to aid in maintaining the top of the assembly free from dirt, moisture and foreign matter.

The above described attributes and benefits are all embodied into the air track structure of the present invention to provide a mechanism having unlimited uses and applications in connection with mobile vehicles, implements and other kinds of machinery.

Figure 4:
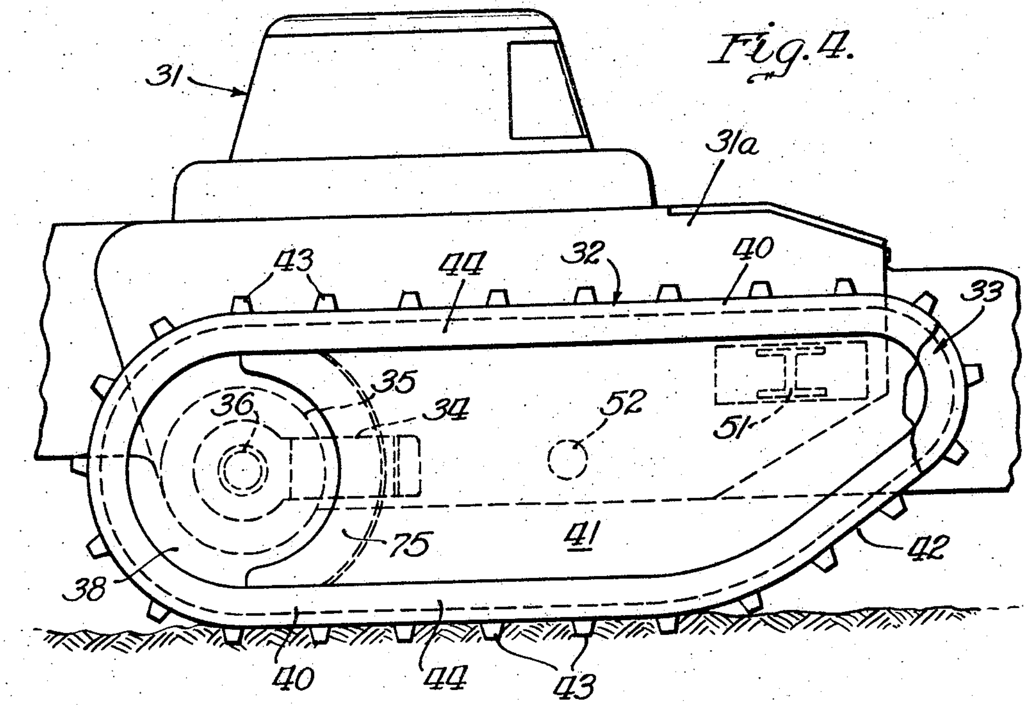
FIG. 4 is a side elevational view of a representative vehicle incorporating the air track of the present invention to illustrate one adaptation thereof which is obviously applicable to any type of a vehicle or piece of equipment that requires positive traction and stable support.
Figures 6, 7:
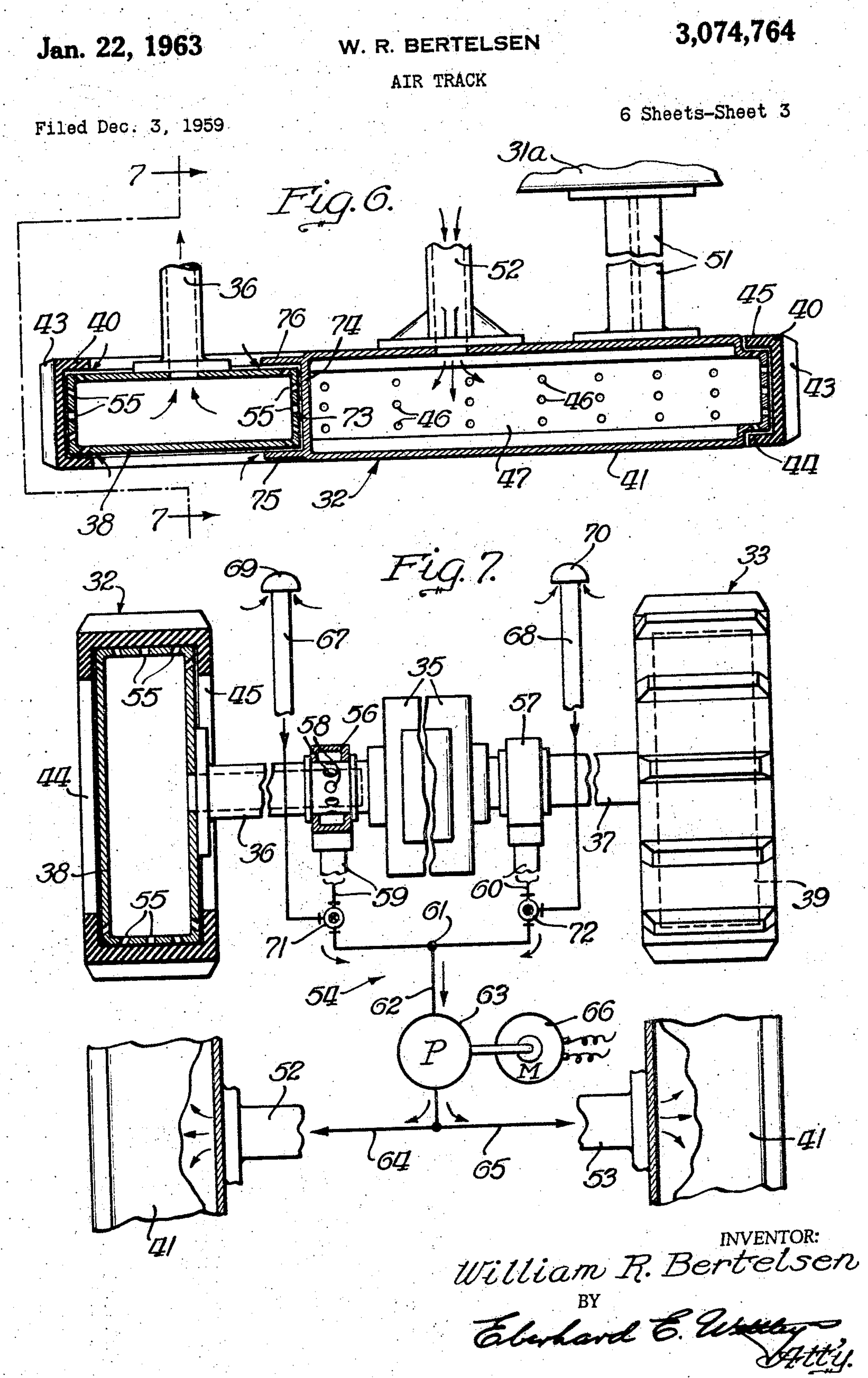
FIG. 6 is a cross sectional view of the air track taken horizontally thereof and substantially as the unit appears when viewed along the plane of the line 6—6 in FIG. 5.
FIG. 7 is a general schematic view of the air track driving and operational mechanisms, the left hand track being shown in section as it would be seen when viewed along the plane of the line 7—7 in FIG. 6.

FIG. 4 shows a vehicle 31 suitably supported upon and propelled by air track assemblies 32 and 33 of substantially identical construction. In general, an engine 34 on vehicle 31 is arranged to drive through a speed changing transmission 35 that includes suitable independent drive shafts 36 and 37 connected with the driving wheels 38 and 39 of the air tracks 32 and 33. The air track assemblies 32 and 33 will be described by use of the same reference characters which will denote similar parts and members. FIG. 7 shows both tracks 32 and 33.

Figure 5:
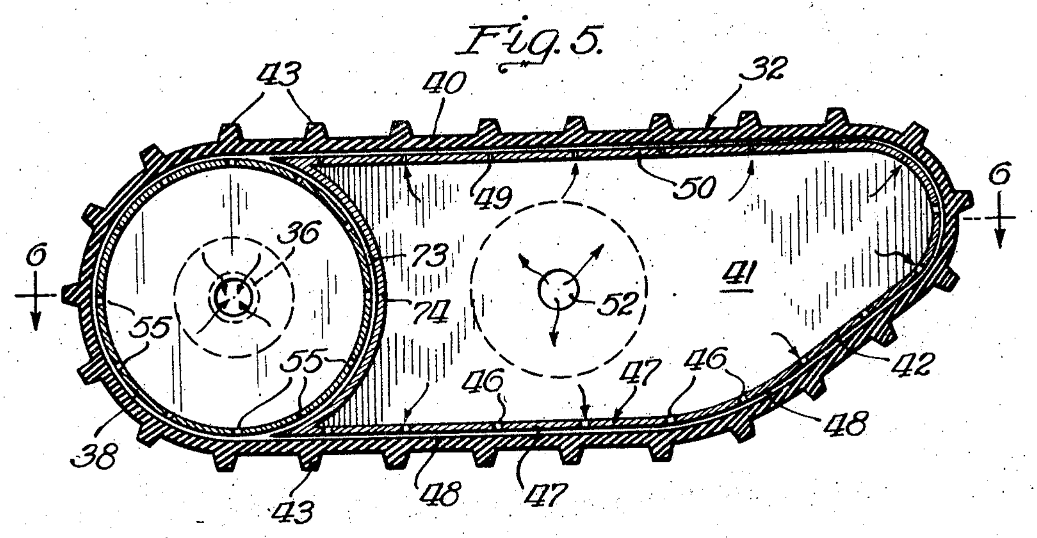
FIG. 5 is a side elevational view of one of the air track assemblies shown in section along a vertical plane taken generally longitudinally of the track unit.

With reference to FIGS. 5, 6 and 7, the air track 32 comprises a continuous flexible tread 40 entrained over a load carrier in the form of an air box or plenum 41 to conform with the exterior shape or contour of the box, the tread leaving the carrier box at the power end of the track to encircle a 180 degree portion of the drive wheel 38 of the air track 32.

Box 41, acting as a load carrier, is made to fill in and occupy all of the space within the tread loop and also encircles certain tangential portions of the driving wheel 38. The forward end of box 41 is angled upwardly at 42 to dispose the tread 40 in an upwardly inclined relation to the front of the vehicle to pass or climb over obstructions encountered in the line of travel of the vehicle.

Wheel 38 is actually in the form of a smooth exterior pulley to function as a means to drive the belt or tread 40 and to convey the tread about the air box 41 to keep the belt or tread in motion to roll the tread along or upon the ground thus forwardly advancing the air box carrier within the interior loop of the run of the belt or tread 40.

The belt or traction tread 40 is made with exterior cleats 43 to engage and grip the supporting surface or ground, while the interior surface part of the belt or tread is flanked with laterally outwardly positioned rims or guide flanges 44 and 45 that are supplied to straddle both the wheel 38 and the air box 41. This arrangement provides a combination air box or plenum 41 and an adjacently situated and aligned drive wheel 38 that are both covered by the moving belt or tread 41 which is guided along or over the two described instrumentalities by means of the retaining flanges 44 and 45.

The air box or plenum 41 has air dispersion openings or orifices 46 formed through its lower wall 47 for communication with the space between the tread and box. By introducing air under pressure into the air box 41 to leak or vent out of the openings 46, an air cushion is created in the air confining space 48 existing between the lower portion of the box 41 and the upper surface of the ground engaging belt or tread 40. This action will provide an air lift or support upon tread 40 whereon to float the box 41 out of physical contact therewith and to cause the tread to pass freely under the air box in friction free relation as previously expressed under the principle of pressurized air lubrication as explained broadly with reference to FIGS. 1 and 3. Some very small air bleed vents 49 may be provided in the top wall 50 of the box to float the top run of the belt or tread 40 over the top of the box 41. Very little air pressure is required over the top of the box to carry the top run of the tread 40 since only the weight of the tread per se need be overcome. But the lower coacting and relatively movable supports involve upholding or carrying the weight of the entire vehicle secured to the box, with the box operating within the tread both for bodily support and for actuation over the ground or road in caterpillar tread action and manipulation.

FIG. 6 illustrates generally how the vehicle body 31*a* may be carried or supported from the pair of air tracks, only one track 32 being there shown. Suitable bracket and structural beam members 51 may be secured to the air box portions of the treads to support the body 31*a*. Also, the axles or hollow shafts 36 and 37 that are attached with the wheels 38 and 39 are journalled in the vehicle body 31*a*. Other braces or frame members may further be employed to suspend or carry the vehicle body 31*a* from the air treads. The pressurized air delivery ducts 52 and 53 for the boxes 41 are included in such other vehicle supporting means as best shown in FIGS. 6 and 7.

The air supply system is diagrammatically shown at 54 in FIG. 7 including the hollow air wheels 38 and 39 that are provided with inlet openings or vents 55 located about their peripheries to permit air intake or passage into the hollow drive axles or shafts 36 and 37. Suitable air collecting ring units 56 and 57 permit inlet air communication from within axles or shafts 36 and 37 through suitable apertures 58 for passage into branch air lines 59 and 60 that join at 61 with the inlet line 62 leading to a pump or blower 63. From pump 63 air under pressure is forced into branch lines 64 and 65 to deliver this air supply under pressure into the ducts 52 and 53 of the air boxes or plenum means 41 to create the air cushion separation between the boxes and their adjacent track treads by holding the boxes upwardly and free of the belts or treads 40.

Pump 63 may be driven from the engine 34 under selective control means to initially establish an air pressure condition, but in FIG. 7 a separate electric motor 66 is employed for driving the pump or blower 63 to provide an independent air source that is not connected with the main prime mover of the vehicle.

FIG. 7 further shows supplemental air intake means which are depicted by snorkel tubes 67 and 68 that have air entry fixtures 69 and 70 disposed at an elevated location on the vehicle and which tubes connect through control valves 71 and 72 with the air inlet lines 59 and 60. This arrangement permits selective air intake either through the wheels or independently of the wheels through tubes 67 and 68 which choice would be required when wet or watery conditions are encountered by the vehicle.

One of the advantages of providing wheels 38 and 39 with air inlet openings is to thereby introduce a means, by limited suction, to cause better tractive belt grip of the treads 40 over the drive wheels 38 and 39. Air entry would still be well insured by air intake through the openings of the wheels that are normally located in exposed positions in the belt free portions of the wheels which are out of belt contact. These openings appear at the zone 73 adjacent the arched wall 74 of box 41 which part of the box also carries the arcuate side flanges 75 and 76 that are seen in FIG. 6 and which flank the belt free half of the wheel 38.

The construction of the air track 32 just described involves the use of a fairly rigid track except for the external driving belt or tread 40 which is made of a tough but resilient material such as reinforced rubber, synthetic rubber or the like. No boggies or other wheel means are used and only one drive wheel is employed in conjunction with a light weight hollow air box or plenum chamber. This simple structure is made possible by reason of the air lubricated tract that provides a supporting air cushion offering substantially no friction depending upon the contours of the adjacent surfaces of the tread and box or wheel means. Conceivably a drive wheel or other power means could be employed to engage the tread at an external peripheral point or area and to use an air box to completely fill the tread loop. While this is also feasible, such an arrangement does sacrifice the compactness possible with the single wheel drive within the tread loop as shown in FIGS. 4 and 5.

Figure 8:
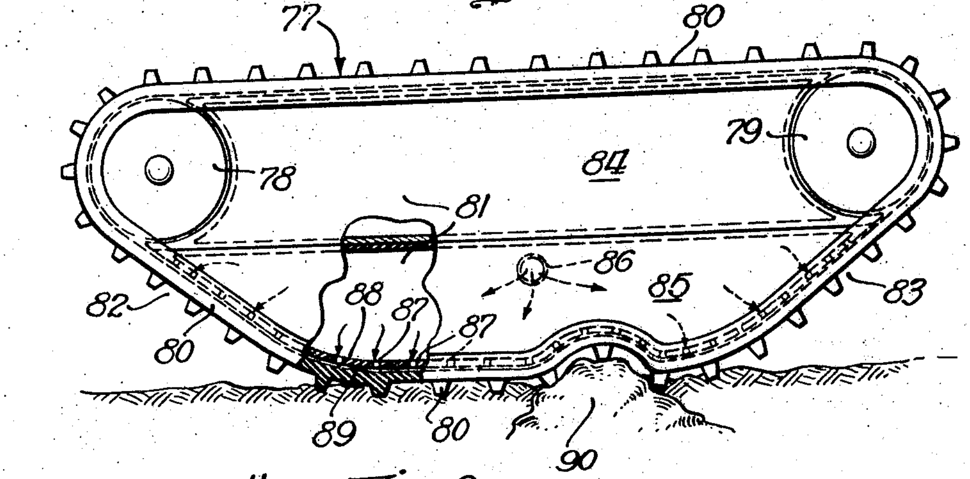
FIG. 8 is a side elevational view of a modified air track structure, partially broken away and in section, this arrangement introducing a greater ground contact flexibility to reduce the rigidity of the track.

Referring now to FIG. 8, this air track 77 embodies the use of two smaller driving wheels such as 78 and 79, one of which may be an idler if desired, and the tread 80 follows the wheel peripheries and encircles a composite air box or composite plenum 81 providing double upsloping ends 82 and 83. The air box or plenum 81 comprises a dual chamber unit having a hollow dummy metal chamber 84 and a chamber 85 constructed from tough but resilient flexible material that is connected with and underlying the metal chamber 84.

Air under pressure is supplied through a suitable air duct 86 into the resiliently walled chamber 85 to keep the physical portions thereof well inflated and to bleed air out of openings 87 to establish an air cushion guideway between the bottom wall 88 of chamber 85 and the adjacent face 89 of the running tread 80.

The track 77 is constructed to provide a resilient ground engaging section adapted to readily give and flex when passing over ground obstructions such as 90. Actually the lower air supply chamber or plenum 85 may be varied in depth to accommodate certain conditions of operations. This track, therefore, introduces a flexing ground contact face having obvious operational advantages and benefits.

Figure 9:
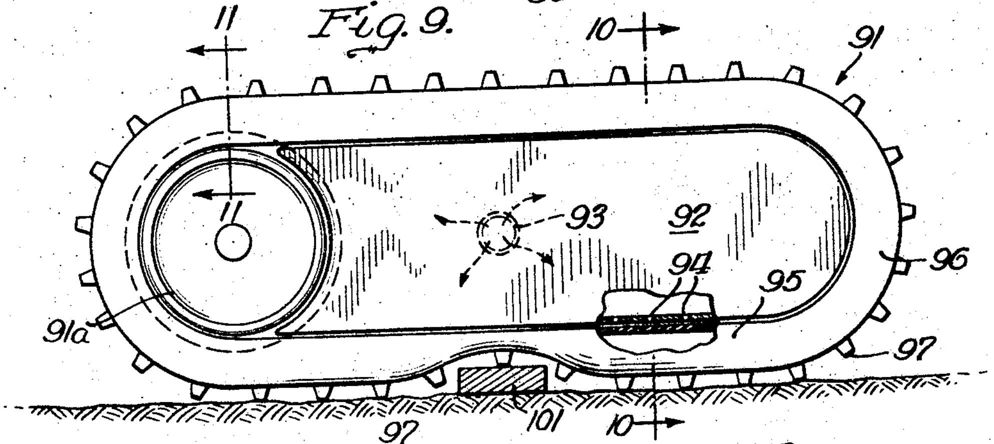
FIG. 9 is a side elevational view of another modified construction of air track depicting a still further way in which to overcome ground contact rigidity of an air track of the present invention.
Figure 10:
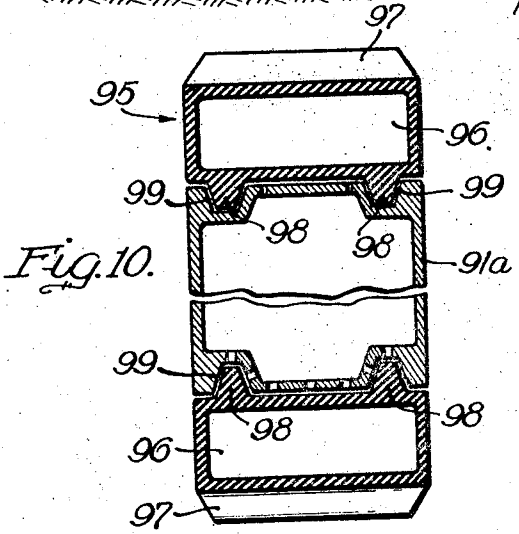
FIG. 10 is a vertical cross sectional view of the modified track in FIG. 9 as the same appears when viewed substantially along the plane of the line 10—10 in FIG. 9.
Figure 11:
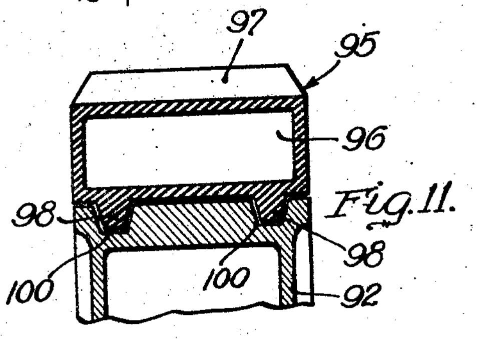
FIG. 11 is a fragmentary vertical cross sectional view of another part of the air track shown in FIG. 9 and as taken substantially along the plane of the line 11—11 in FIG. 9.

FIGS. 9 to 11 portray another construction having surface deflecting or flexing ability. The air track 91 involves the use of a drive wheel 91*a*, an air box or plenum 92, and an air supply duct 93, with air exit vent openings 94 opposing a tread or belt 95. The tread 95 is hollow and inflated like a tire and comprises belt tube having earth engaging cleats 97 on one face and longitudinal tapered track ridges 98 on its other face for driving contact with corresponding grooves 99 in wheel 91*a* while the ridges are also adapted for guidance along grooves 100 that surround the outer contour of the box or plenum 92.

The track 91 thus has the facility of giving and flexing over obstructions such as member 101 in FIG. 9. While the flexing takeup in track 77 in FIG. 8 is absorbed by the air box or plenum 85, the track 91 in FIG. 9 absorbs the shock of ground obstructions in the tread or belt 96 per se. Both tracks utilize the air cushion feature to introduce a frictionless operation between the relatively moving elements comprising the tread and air box structure.

Figure 12:
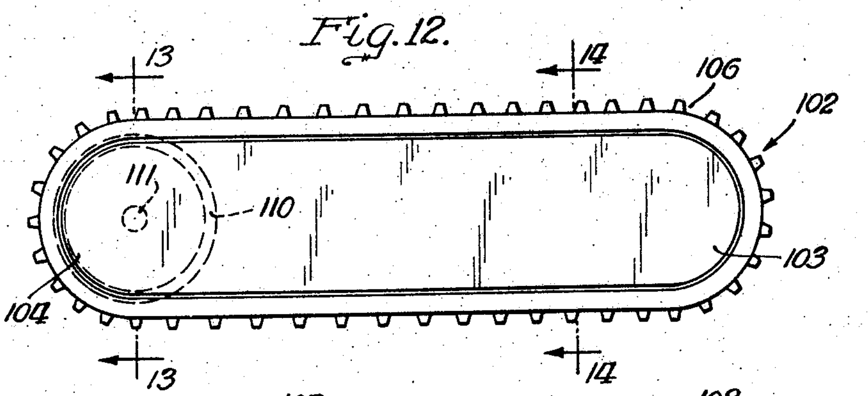
FIG. 12 is a general side elevational view of a modified air track structure incorporating a positive interlocking power drive means adapted for moving the track to propel a supported and attached vehicle.

FIGS. 12, 13 and 14 show the air track principle incorporated into a unit using an air box or plenum to fill the entire tread loop and providing a toothed drive wheel to mesh with tread imbedded teeth as a positive tread drive mechanism. The air track 102 comprises an air box 103 having a forked or divided plenum end forming spaced terminal sections 104 and 105. A tread or belt 106 encircles the air box unit and incorporates an imbedded flexible metallic belt 107 carrying teeth 108 that ride in the peripheral box groove 109 and in the space between the plenum end sections 104 and 105. A toothed drive wheel 110 is driven by shaft 111 that enters the split plenum space 112 through an opening in section 105 that accommodates a suitable shaft bearing 113. Openings 114 are provided in the plenum for the air cushion support of the plenum or box upon the tread 106. Small bleed vents 115 may be used to aid tread travel across the top of the air reservoir means comprising the air box or plenum 103.

FIGS. 15 and 16 have been added to illustrate another application of the air track principle in the form of a conveyor 116 providing an air cushion belt run to support and convey articles. The unit primarily comprises a belt 117 that is carried by pulleys 118 and 119, one or both of which may be driven, and the belt 117 passes over or across the top wall 120 of an air box or plenum 121. A blower 127 is suitably driven by a motor 123 to supply air under pressure through duct 124 into the interior of the plenum chamber 121 for pressurized dispersion of air through the apertures 125 in wall 120 of the air box or plenum. The air box or plenum 121 has upright side guide flanges 126 and 127 to form guide means for the articles 128 and for the belt 117.

Under operation the belt 117 rides over a pressurized cushion of air that is maintained under the belt 117 and above wall 120 of the air box or plenum 121 to establish a frictionless lubricated relationship between the belt and plenum while conveying the articles such as 128 along the conveyor.

It should be noted that the construction just described and shown in FIGS. 15 and 16 may be further applied and adapted to provide moving sidewalks and moving escalators embodying the same conveying principles and air lubrication mechanisms. Many of the principles depicted may be reversed without changing the inventive concept. In all modifications shown the track or belt moves relatively to the air cushion mechanisms. In the tractor illustrations a forward motion is developed to bodily move a vehicle or the track assembly in a given direction. In the conveyor illustration, the entire assembly remains in one location, but the belt encircles the cooperating air units.

FIGS. 17, 18 and 19 show another form of the invention which provides a power track assembly that may be used to move a vehicle. The same arrangement can be used as a conveyor to move the belt or track about the air cushion instrumentalities all without change in the fundamental features here developed. While the track assembly is shown as ground supported and passing thereover, the same may be used to convey heavy articles having somewhat irregular contours accommodated by the automatic action of the articulate air shoes.

The track assembly 130 in FIGS. 17 to 19, comprises a central track box or plenum section 131 forming an air chamber and providing suitable structural elements such as 132 and 133 to connect with a vehicle or other unit to be rendered mobile, element 132 serving as a hollow duct to constantly supply air under pressure into the box 131 to serve the articulate shoe means comprising air conduit means between the box and track.

A plurality of shoes 134, 135, 136, 137, 138, 139 and 140 surround the box 131 and these shoes have sliding contact with the interior peripheral surface area of a continuous flexible track 141. The shoes are all similarly supported from the box 131 and guided for predetermined operation by duplicate mechanisms. The same reference numerals will be used in each shoe assembly shown.

Each shoe has side links 142 and 143 pivotally connected upon shoe pins 144 and 145. Both pins 144 and 145 as well as the shoe ends of the links 142 and 143 lie in recesses 146 and 147 formed centrally in opposite shoe faces. This produces a flush sided shoe link arrangement to guide along the flexible belt or track 141 in the trough thereof defined by the radially inwardly directed belt flanges 148 and 149.

Each link 142 and 143 is slotted at 150 and 151 for guidance relatively to pins 152 and 153 secured to the box 131 to permit both translatory and pivotal movement of the shoe links. Box 131 and each shoe have aligned sockets or recesses 154 and 155 to receive opposite ends of an expansion spring 156 therein. Spring 156 functions to hold the shoes extended as limited by their respective links 142 and 143, with the shoes slidably in contact with the flexible track 141.

The shoes 134 to 140 are all hollow as shown in FIG. 18. Individual air lines such as 157 in FIG. 17, connect the box 131 with the shoes to supply pressurized air to the shoe interiors. As best seen in FIGS. 18 and 19, air is bled or expelled through the bottom shoe walls 158 out of apertures 159 into the trough area of the track 141 to establish air cushions between the shoes and track for minimum frictional contact between the described members.

A drive wheel or pulley 160 is driven by a suitable power means from an attached vehicle or power unit connected with shaft 161, the wheel having driving contact with the trough portion of the track 141 to advance the track assembly over a supporting surface.

When traveling over generally flat terrain, the track assembly will function with the various mechanisms occupying the position shown in FIG. 1. Upon contact with a road irregularity, the shoes and track will assume positions of conformity with respect to the road rise or depression of the latter may be encountered. FIG. 18 shows one such occurrence.

Attention is directed to the compound action obtainable with the multiple shoe arrangement. Each shoe has two pivotal centers, the aligned pins 144 and 145, and the aligned box pins 152 and 153. The shoes may bodily swing about the box pins or individually swing on the links by means of the shoe pins 144 and 145. The shoes may also move bodily upwardly as guided by the link slots of the links as the slots coact with the box pins 152 and 153. Obviously, many compound motions are possible with the shoe suspension mechanism employed. Shoe swing or rotation is limited by the recess walls 162 and 163 shown in FIG. 17, which indicated walls are made to contact the adjacent edges of the shoe links confined within the shoe recesses 146 and 147.

The top shoe assemblies may be lighter in construction since they only need to carry the upper run of the track 141. Preferably, the upper shoes 139 and 140 are only provided with a few smaller air bleed openings 164 as seen in FIG. 18 to air cushion the track overpass along the track assembly.

The above description has been directed to a number of selected adaptations of the air cushion principles to caterpillar tracks and to analogous arrangements all serving to provide efficient apparatus to perform the functions depicted. While certain changes and modifications in the exact designs of the various elements or combinations thereof are contemplated without departure from the fundamental inventive concept, the extent of such variations shall, however, be governed by the breadth and scope of the language appearing in the hereinafter claimed subject matter directed to the air track means of the present invention.

What I claim is:

1. An air track assembly comprising a carrier, a drive wheel disposed beyond one end of the carrier, and a flexible track entrained over both said carrier and drive wheel, said carrier and drive wheel together providing complementary housing means that fill the interior of said flexible track, said carrier having a hollow chamber with communicating apertures formed through a predetermined portion thereof in positions lying adjacent said entrained flexible track, and an air supply means connected with said carrier chamber to introduce air under pressure into said chamber for dispersion through said chamber apertures into an area between said track and carrier to establish a given pressurized cushion of air in said area to urge said track and carrier out of physical contact relation with respect to each other under operative conditions.

2. A fluid lubricated traction assembly comprising a flexible track, a carrier located within said flexible track, a drive unit also located within said flexible track and connected to actuate said track, said carrier and drive unit providing separated coacting complementary shapes having track guiding surfaces thereon defining a given external contour, said flexible track encircling said carrier and drive unit to provide a mobile supporting section to uphold both said carrier and the separate drive unit, said carrier comprising a hollow chamber having openings directed toward the supporting section of said flexible track, and a fluid supply means having communication with said carrier chamber to introduce fluid under pressure into said chamber for dispersion out of said chamber openings into the space lying between said supporting section of said flexible track and the adjacent portion of the carrier to normally urge said carrier out of physical contact with respect to said track.

3. In the fluid lubricated track assembly in claim 2, with the addition of auxiliary vents in an upper portion of the carrier chamber to direct fluid into the space between the tractive inactive portion of the flexible track and the next adjacent portion of the carrier to urge said inactive track out of physical contact with respect to the upper portion of the carrier.

4. In the fluid lubricated track assembly in claim 2, with the addition of coacting elements on said track to engage non-apertured portions of said carrier to provide a limited seal therewith to aid in the retention of the fluid in the physical separation space between said track and carrier, said coacting elements also providing orientation means to hold the track upon said carrier and on said drive unit.

5. An air track assembly comprising a continuous flexible traction means defining a predetermined shape of open loop encircled by said means, a hollow drive wheel filling a part of said open loop and having contact with a portion of said traction means, a hollow carrier coacting with said drive wheel and supported upon said traction means to occupy the balance of the available space in said open loop traction means, and air compression means connected with said hollow carrier to deliver air under pressure into the hollow carrier, said carrier having air discharge apertures therein arranged to deliver air under pressure into the space between said supported carrier and the supporting portion of said traction means to establish an air cushion between said traction means and the adjacent supported carrier.

6. An air track assembly as in claim 5 wherein said hollow drive wheel is provided with peripherally located openings disposed in the path of said encircling traction means, and air inlet means are provided for communication between the hollow drive wheel and said air compression means to establish air suction through said wheel to augment the tractive effort expended between said wheel and said flexible traction means.

7. A track assembly as in claim 6 including independent air inlet conduit means connected with said air compression means, said conduit means and said wheel air inlet means including regulatory valves to selectively cause flow of intake air from said hollow wheel and from said conduit means respectively.

8. In an air track assembly as in claim 5 with the addition of coacting positive drive elements on said drive wheel and said traction means respectively to positively convey the traction means about said carrier.

9. Power mechanism to propel a mobile vehicle comprising a carrier including a plenum section, a flexible track entrained about said carrier and the plenum section thereof, drive means connected with said flexible track to move said track around said carrier and the plenum section, and conduit means connected with said plenum section to supply air under pressure to said section, said plenum section being constructed of flexible inflatable material and occupying a position over the ground engaging portion of the flexible track whereby said plenum section and track are both adapted to flex and deform in passing over ground obstructions and irregularities, said plenum section being provided with air vent openings communicating with space between the flexible track and the portion of the plenum section lying adjacent said track to establish a pressurized cushion of air in the aforesaid space to urge said plenum section out of physical contact with said track.

10. Power mechanism to propel a mobile vehicle comprising a load supporting carrier, a flexible track encircling said carrier exterior and providing propulsion means to convey said carrier over the ground, and drive means to actuate said track about said carrier, said track and carrier having coacting guide means thereon to maintain said respective units in operative relation with respect to each other, and said flexible track being constructed with a hollow inflatable interior for operative disposition between the carrier and the ground to provide a flexing and deformable ground engaging track portion to absorb road shock transfer to said carrier and to negotiate road irregularities without carrier interference, said carrier comprising a plenum, and conduit means connected with said plenum to supply air under pressure to the plenum, said plenum being provided with vent openings communicating with a selected portion of the space between said plenum and track to establish a cushion of pressurized air in said space to urge physical separation between said plenum and track.

11. An air track assembly comprising an air plenum section forming a box, a drive wheel, and a flexible track entrained over the wheel and encircling said air box in spaced relation about said box, and air conduit shoe means being connected with said box and disposed in contact with said track, said shoe means having air vents functioning to direct pressurized air against internal peripheral portions of said flexible track to establish an air cushion between said track and said shoe means to support the box within said encircling flexible track.

12. An air track assembly comprising an air plenum section forming a box, a drive wheel, and a flexible track entrained over the wheel and encircling said air box, and air conduit shoe means connected with said box and disposed in contact with said track and functioning to direct pressurized air against internal peripheral portions of said flexible track to establish an air cushion between said track and said shoe means to support the box within said encircling flexible track, said air conduit shoe means comprising a plurality of articulate air shoes carried by said box for operative disposition adjacent to the radially inner surface portion of said flexible track.

13. An air track assembly comprising an air plenum section forming a box, a drive wheel, and a flexible track entrained over the wheel and encircling said air box, and air conduit shoe means connected with said box and disposed in contact with said track and functioning to direct pressurized air against internal peripheral portions of said flexible track to establish an air cushion between said track and said shoe means to support the box within said encircling flexible track, said air conduit shoe means comprising a plurality of individually mounted shoes movably connected with said box and presenting guide surfaces for riding within said flexible track, said shoes having air exhaust apertures in their respective guide surfaces to discharge pressurized air between the shoes and the adjacent areas of the track at the shoe locations, and flexible air transfer means connected between said box and each of said shoes to supply air to said shoes for discharge out of the exhaust apertures of the shoes.

14. Power mechanism to propel a mobile vehicle comprising a vehicle carrier having a pressurized air plenum section, a looped flexible track, a drive wheel to move said track, and a plurality of shoes disposed in operative positions within and against said looped track, said plenum section being spaced from the track in a location remote from said shoes, and link means connected with said plenum section and with said shoes to allow relative motion between said shoes and plenum section, said shoes being hollow and having openings located on the track contacting faces thereof, and air conducting means connected with said plenum section and with said shoes to permit air transfer into said shoes for discharge against the adjacent track to establish an air cushion between said shoes and track.

15. In a power mechanism as in claim 14, wherein said link means are each pivotally connected with said plenum section and with said shoes, said link means each including a lost motion connection at one of the pivotal locations to accommodate shoe retraction.

16. In the combination in claim 15 including coacting stop means on the link means and connected shoes to limit the amount of relative motion between said connected members.

17. In a power mechanism as in claim 14, wherein spring means are interposed between said plenum section and the shoes to normally maintain said shoes in their extended load carrying positions and to permit shoe retraction under track deformation when passing over ground obstructions.

References Cited in the file of this patent

UNITED STATES PATENTS

| | | |
|---|---|---|
| 756,600 | Dodge | Apr. 5, 1904 |
| 809,048 | Furchtbar | Jan. 2, 1906 |
| 849,882 | Bartley | Apr. 9, 1907 |
| 2,309,603 | Kohn | Jan. 26, 1943 |
| 2,326,659 | Kohn | Aug. 10, 1943 |
| 2,575,845 | Singer | Nov. 20, 1951 |
| 2,652,290 | Bekker | Sept. 15, 1953 |
| 2,867,480 | Cushman | June 6, 1959 |
| 2,877,538 | Conlon | Mar. 17, 1959 |
| 2,900,210 | Parsons | Aug. 18, 1959 |
| 2,987,347 | Cook et al. | June 6, 1961 |